United States Patent [19]

Verbauwhede et al.

[11] 4,119,748

[45] Oct. 10, 1978

[54] STEEL CORD REINFORCED PLASTIC MATERIALS

[75] Inventors: Germain Verbauwhede, Zwevegem; Frans Coopman, Harelbeke, both of Belgium

[73] Assignee: N. V. Bekaert S.A., Zwevegem, Belgium

[21] Appl. No.: 689,974

[22] Filed: May 26, 1976

[30] Foreign Application Priority Data

Jun. 5, 1975 [GB] United Kingdom ............... 24300/75

[51] Int. Cl.$^2$ ..................... B32B 15/18; B32B 17/02
[52] U.S. Cl. ........................... 428/36; 138/140; 138/145; 138/172; 156/169; 156/173; 156/175; 156/180; 428/35; 428/109; 428/113; 428/224; 428/225; 428/240; 428/260; 428/285; 428/290; 428/293; 428/297; 428/298; 428/379; 428/417; 428/418; 428/430; 428/432; 428/458
[58] Field of Search ............... 428/36, 109, 110, 111, 428/112, 113, 114, 201, 209, 228, 256, 285, 292, 293, 297, 298, 364, 379, 365, 392, 224, 240, 35, 225, 260, 290; 138/140, 145, 172; 156/169, 173, 175, 180; 57/140 BY, 140 G

[56] References Cited

U.S. PATENT DOCUMENTS

| Re. 26,731 | 12/1969 | Robinson | 428/111 X |
|---|---|---|---|
| 1,983,617 | 12/1934 | Ladon | 428/285 X |
| 2,475,083 | 7/1949 | Davis | 57/140 BY |
| 2,836,529 | 5/1958 | Morris | 428/236 |
| 3,107,698 | 10/1963 | Baker et al. | 428/109 X |
| 3,490,983 | 1/1970 | Lee | 428/113 |
| 3,565,741 | 2/1971 | Jaray | 428/285 X |
| 3,674,620 | 7/1972 | McCarthy et al. | 428/293 X |
| 3,778,334 | 12/1973 | Sturgeon | 428/285 |
| 3,784,441 | 1/1974 | Kaempen | 428/112 |
| 3,881,522 | 5/1975 | Lewis et al. | 428/36 X |
| 3,949,126 | 4/1976 | Crawford | 428/113 |
| 3,956,564 | 5/1976 | Hillig | 428/364 X |

Primary Examiner—Lorraine T. Kendell
Attorney, Agent, or Firm—Shlesinger, Arkwright, Garvey & Dinsmore

[57] ABSTRACT

Reinforced plastic articles such as pipes, receptacles and sheet-like laminated structures wherein the reinforcing material comprises at least one layer of a combination of glass fibers and steel cord; processes for making same.

37 Claims, 7 Drawing Figures

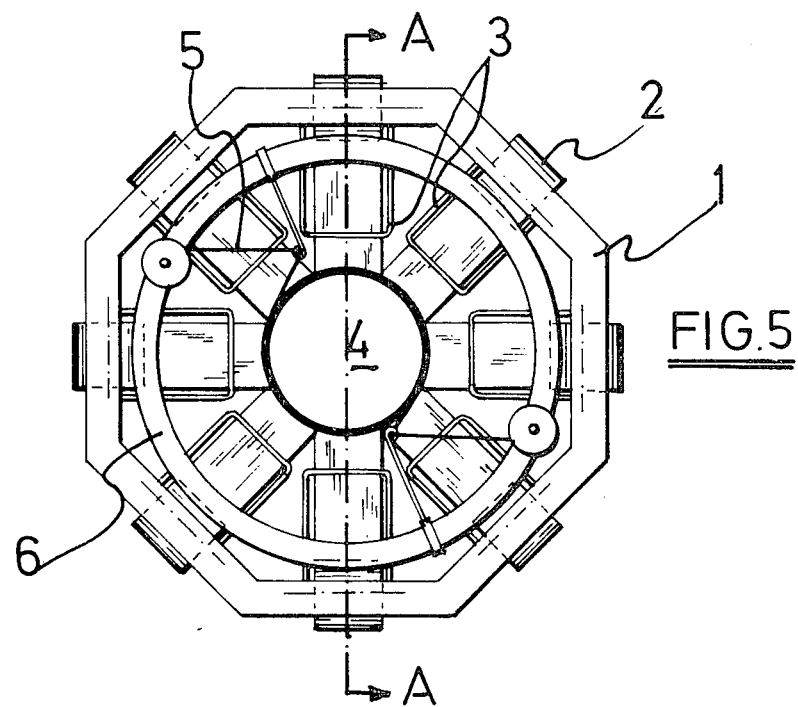
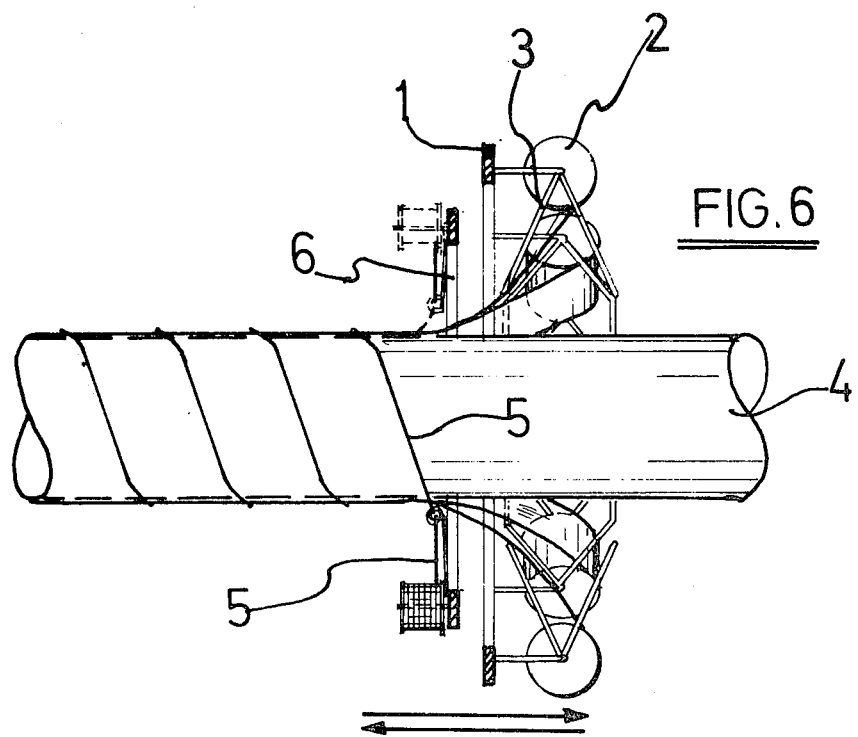

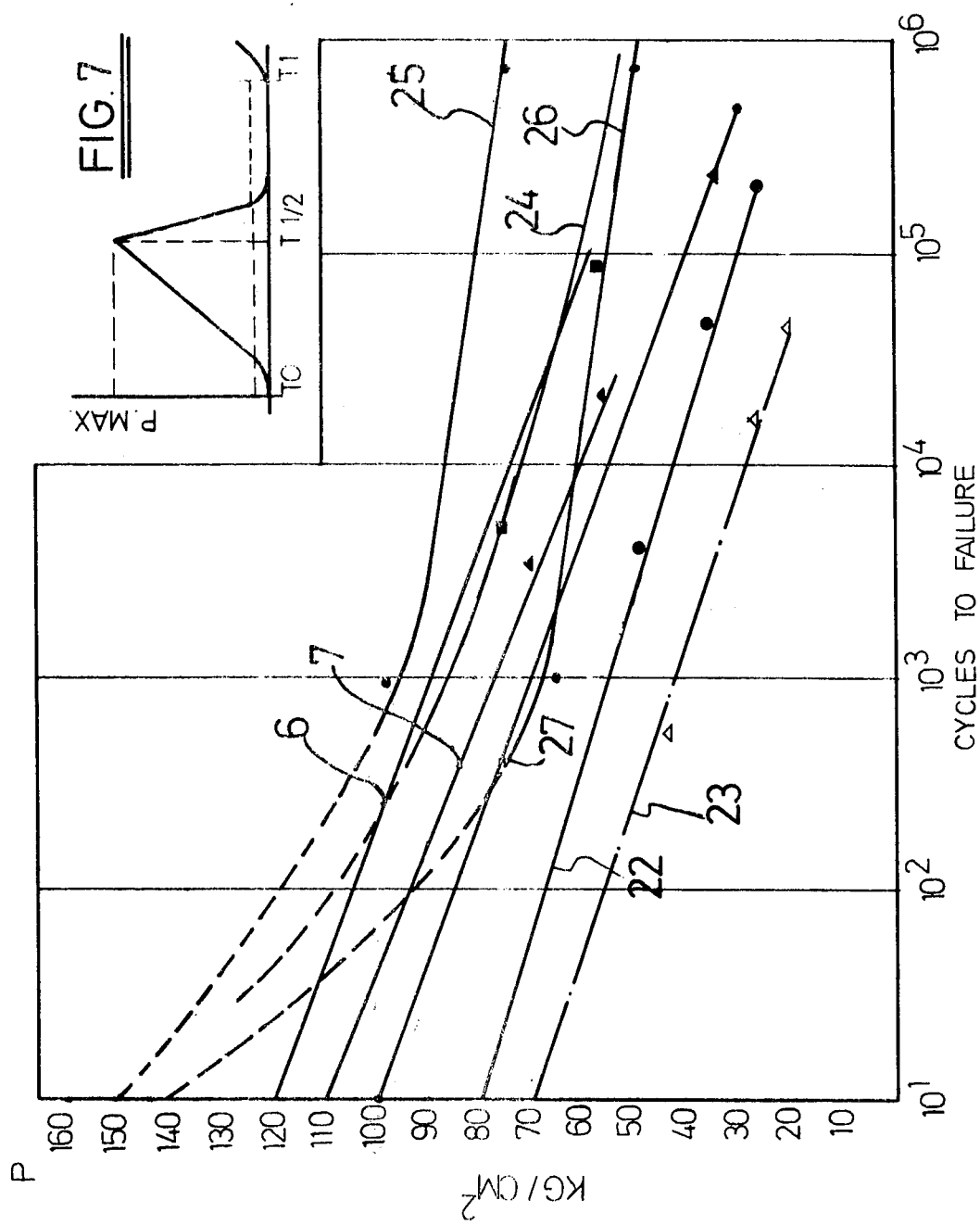

STEEL CORD REINFORCED PLASTIC MATERIALS

The present invention relates to reinforced plastic materials and more particularly but not exclusively to reinforced plastic materials in the form of pipes and like articles.

Filament-wound reinforced plastic articles are being increasingly used in widely differing fields of application. This increasing use is believed to be due, at least in part, to the fact that the articles can be readily manufactured on a commercial scale with relatively low labor costs and that the manufacturing can be carried out to provide homogeneous products having predetermined mechanical properties selected according to the intended use of the products.

Examples of such filament wound reinforced plastic articles include plastic pipes, e.g. for transporting liquids including overhead as well as underground pipes, containers, electrical switchgear housings, chimneys and ski-poles. Relatively new forms of the above filament-wound plastic articles are boilers, machine parts such as pneumatic and hydraulic cylinders, downhole pipes, spindles for rolls of thread-like or sheet-like products, lamp standards, poles for electricity and telephone cables, golf clubs, air compressor parts, gas cylinders etc.

Up to a few years ago the reinforcement of plastic articles was generally effected by the use of glass fibers in various forms. Thus, for example, the glass fiber could be used in a continuous form (e.g. delivered from a spool) either alone or in conjunction with woven materials, or in the form of staple fibers which were either applied in mat form or sprayed on to the plastic material. For certain special applications such as for aircraft or spacecraft, other reinforcing materials such as carbon fibers have been used.

Many of the above-described glass fiber-reinforced plastic materials have often been found to suffer from a lack of rigidity and a relatively low resistance to creep and fatigue. Also there is a reluctance on economic grounds to use expensive reinforcing materials such as carbon fibers in order to overcome the above disadvantages associated with glass fiber-reinforced plastic materials, and steel wire has therefore been proposed as an alternative reinforcing material. The reinforcing steel wire can be in the form of steel wire per se, woven steel wire fabrics or unidirectional non-woven steel wire fabrics wherein a series of parallel steel wires are bonded to, and supported by, a thin non-woven glass fiber backing sheet; the latter non-woven fabrics are herein referred to as "wire-sheet".

Besides an increase in rigidity, the use of steel wire as reinforcement was found to provide simultaneously a somewhat greater creep- and fatigue-resistance, and these advantages in general outweighed the disadvantages of the use of steel in reinforced plastics arising for example from its high density and its relatively poor adhesion to plastic. Moreover, steel wire used in conjunction with glass-fiber in a well designed construction shows indeed very little or no increase in the overall density of the product and still has an improvement in technical properties. However besides the poor adhesion to plastics, the main drawback of steel wire, according to the conclusions of an article by R. H. Stretton and P. Covell entitled "Wire sheet as a reinforcement in resin matrices" published in "Composites", 1970, pages 171 to 175, is its springy nature which makes its difficult to handle.

We have now discovered that plastic materials in the form of pipes, containers or sheet like laminates can be advantageously reinforced by means of a combination consisting essentially of resin impregnated glass fibers and steel cord, the term "steel cord" being used herein in its conventional sense to denote cord composed of two or more steel wires or wire strands (generally from high carbon steel e.g. steel having a carbon content of at least 0.4% by weight) twisted together. By the term combination is meant here that resin impregnated glass fibers are present in the immediate vicinity of the steelcords whereby the orientation of these glass fibers is not predominantly transverse to the orientation of the cords.

In particular, we have found that the use of at least one layer of the above combination of steel cord and glass fibers can provide reinforced plastic materials having surprisingly improved mechanical properties as compared with conventional steel wire-reinforced materials. Examples of properties which can be improved by the use of reinforcements in accordance with the present invention include strength (e.g. bending resistance and tensile strength), rigidity, delamination resistance, impact resistance, creep resistance and fatigue (weeping) resistance. These improvements are thought to be due in part to the better anchoring effect in the plastic of steel cord as opposed to steel wire. The presence of resin impregnated glass fibers in the immediate vicinity of the steelcords either in a random orientation or with the same orientation as that of the steelcords further promotes the wetting of the steelcord surface by the resin but similarly avoids the appearance of pure resin spots or streaks on or interbetween the steelcords, which spots are generally weak places in the composite material. It thus enables to design a composite material which structure is as homogeneous as possible.

A further advantage of the present invention is that the steel cord and glass fiber reinforcing elements are generally easier to work and process than previously used steel wire and glass fiber reinforcing elements. Furthermore the introduction of steel cord instead of steel wire for the reinforcement of plastic material in accordance with the present invention does not require extensive retraining of labor force required to carry out the invention, in contrast to the introduction of the above-mentioned wire sheet as a reinforcing material. Several layers of glass fibers and/or of wire sheet wherein the wires have a certain diameter (and hence a predetermined stiffening effect) can easily be replaced by just one layer of steelcords with an equal stiffening effect but with much quicker and easier processing behaviour. As a consequence the use of less reinforcing material and less plastic material shall result in lighter products with the same or even better mechanical properties, which constitutes a great economic advantage. We have also found that the steel cord can generally be used in conventional filament winding machines without the need for extensive adaptions to the machinery. A still further advantage is that the incorporation of steel cord as reinforcing elements provides antistatic and heat dissipating properties in the products thus obtained. In general it has been found that in pipe like structures including containers, the advantages of using steelcord reinforcing elements in combination with glass fibers according to the invention as compared with glass alone will be more pronounced for large diameter (>50 cm) and longer length (>6 m) pipes or for high performance pipes. Similarly the reinforcing effect of steelcord according to the invention is more pronounced for sheet like laminated structures with large surfaces or for axially reinforced laths with great length.

With regard to the steel cord used in the reinforcement of the plastic material, this can be used as such or in the form of non-woven or woven fabric, for example a woven fabric comprising a steel cord woven together with a synthetic fiber such as a nylon or polyester, the steel cord preferably constituting the warp and the synthetic fiber constituting the weft. The steel cord used in accordance with the present invention may be formed for example by a core wire (e.g. having a diameter of 0.25 mm or more) surrounded by several (e.g. 4 to 7) wires having a diameter not greater than the core wire twisted around the core wire. Alternatively the steel cord may be formed for example by a coreless strand of 2 to 5 wires twisted together, each wire having a diameter of for example 0.15 to 0.60 mm. Other suitable steelcord constructions are composed of a core strand surrounded by wires respectively by other strands or are composed of a coreless structure of wire strands twisted together. In some case it may be preferred to use steelcord constructions composed of a core wire surrounded by a number of wire strands. By using heavier constructions, it is possible to decrease the number of cords (or cord layers) in the composite structure which is necessary to obtain a predetermined improvement in mechanical properties. The steelcords used can further be wrapped with a long lay by a single wire. In this way the bending rigidity of the cord is increased as well as its axial compression resistance.

The plastic material may be either a thermoplastic or thermosetting material, examples of the latter including polyesters, epoxy resins, phenolic resins, melamine-formaldehyde resins, ureaformaldehyde resins, resorcinolformaldenyde resins or polyurethanes as well as thermosetting copolymers. The plastic material may if desired also contain a dry filler uniformly dispersed in it, e.g. an inorganic material which may be present in an amount not exceeding 60% by weight. The presence of a filler lowers the price of the reinforced structure considerably, but has generally a disadvantageous effect on the mechanical properties and the corrosion resistance of the structure and of the wetting capacity of the resin. Fillers can also retard the curing of the resin.

The reinforced plastic material according to the invention may be produced in the form of articles having any desired form. The invention is particularly applicable to the production of articles in the form of reinforced plastic pipes and the like such as are conventionally produced on filament winding machines. Specific examples of such articles are described in more detail below.

Where pipes and like articles e.g. body portions of containers are concerned the steel cord and glass fiber reinforcing elements can be arranged in the plastic material with the cords and fibers in an axial direciton or in a circumferential direction transverse to the axis. If desired the reinforcing elements can contain a combination of axially and circumferentially disposed steel cords and glass fibers, the reference herein to circumferentially disposed steel cords and glass fibers intended to include within its scope steel cords and glass fiber which are at angles other than 90° to the axial direction, as will for example be the case if an unidirectional non-woven fabric of steel cords or glass fibers is arranged helically in the manufacture of a plastic pipe.

With regard to the combination steel cord and glass fibers several combination forms are possible. Thus for example the steel cord can be at least partially embedded in glass fiber rovings with the steel cords and glass fibers in parallel relationship. In this embodiment, the ratio of the number of steel cords in the number of glass fiber rovings in cross-sections of the same layer preferably does not exceed 2:1 and is advantageously in range of 1:1 to 0.33:1. Alternatively, one or more layers of steel cord material (e.g. as woven or non-woven fabric) can be employed in combination with one or more layers of glass fiber rovings and/or glass fiber fabrics (e.g. a non-woven fabric). The plastic material may thus for example contain a number of layers of glass fiber rovings, combinations of glass fiber rovings with steel cord at least partially embedded therein, combinations of glass fiber fabrics and steel cord fabrics as herein described. These superimposed layers may be axially or circumferentially arranged or a portion of such layers may be axially arranged while the remaining layers are circumferentially arranged. Thus, for example, a plurality of layers of woven steel cord fabric and non-woven glass fiber fabric can if desired be used. At least some of these superimposed layers are preferably separated from one another by glass fiber layers which are advantageously arranged circumferentially while the steel cord and glass fiber fabric layers are arranged axially.

In order to ensure that the plastic materials have the desired properties for the particular use for which they are intended, a suitable combination of glass fiber and steel cord reinforcing elements should be chosen as described below in the Examples.

The present invention further provides methods and machines for the preparation of reinforced plastic materials according to the invention wherein a combination of glass fiber and steel cord are incorporated as reinforcing elements into a plastic material. When the reinforced product is in the form of a pipe or like article the steel cord and glass fiber are advantageously incorporated into the plastic material by the technique of filament winding. Thus, glass fibers impregnated with a plastic material (conveniently a plastisol) and steel cord can be applied on to a stationary or rotating mandrel to provide an axial or circumferential arrangement respectively of reinforcing elements in the plastic material.

The present invention will be further illustrated by reference to the accompanying drawings wherein:

FIG. 5 is a cross-sectional view of an apparatus for producing reinforced plastic pipes according to the invention using woven sheet reinforcement materials; and FIG. 6 is a cross-sectional view along the line A—A of FIG. 5.

FIG. 7 is a graph illustrating the weeping behavior of steelcord reinforced plastic pipes.

Figure 1:
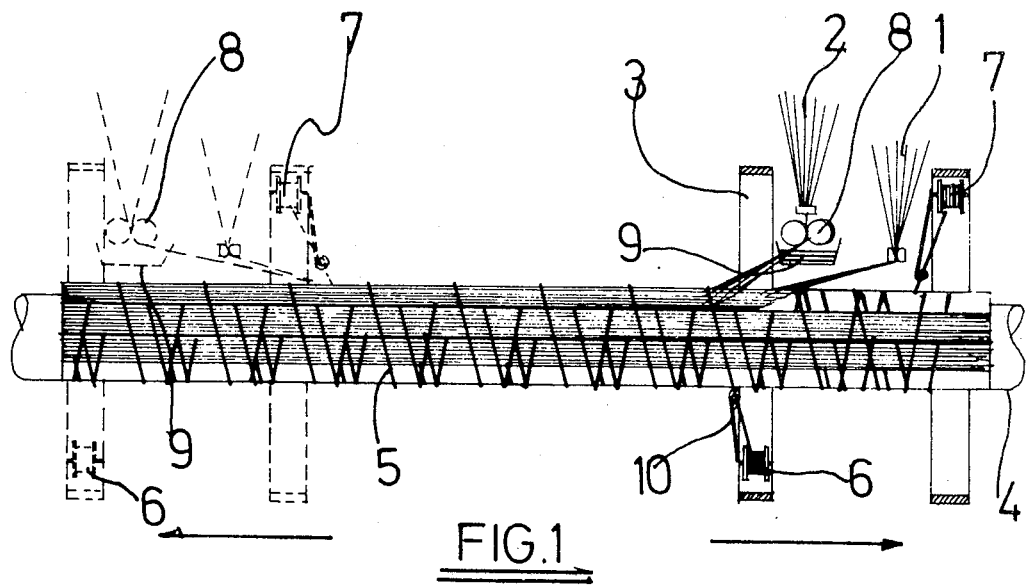
FIG. 1 is a longitudinal view of an apparatus for producing reinforced plastic pipes according to the invention using glass fiber rovings and steel cords in an axial arrangement.
Figure 2:
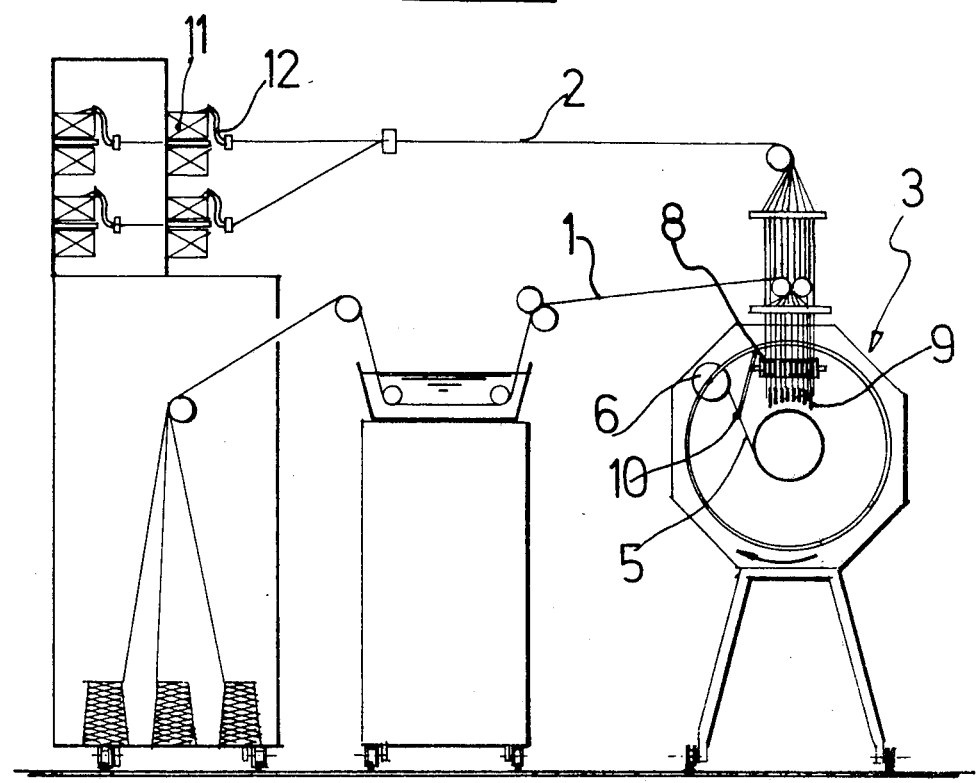
FIG. 2 is a transverse cross-sectional view of the apparatus of FIG. 1.

Referring first to FIGS. 1 and 2, a set of parallel resin-impregnated glass rovings 1 and a set of non-impregnated steel cords 2 are advanced to a guiding system 3 which is mounted in the vicinity of the surface of a stationary mandrel 4 of a conventional filament winding machine, the guiding system comprising essentially a pair of circumferentially grooved rollers 8, through which the steel cords are passed. The glass rovings can be passed through conventional eyelets. The creels and the guiding system 3 are simultaneously moved axially over rails along said mandrel and the reinforcing elements are brought together in mutual longitudinal contact by means of said guiding system and further guided as an axial layer onto the mandrel surface so as to arrange and embed each steelcord in a glass fiber roving. To prevent any disturbance or distortion of the axial layer in a transverse direction and to hold the layer straight and firm in its axial position an elastic tying thread 5 is simultaneously wrapped with a large lay and under a certain tension on to the axial layer by means of a suitable winding system 6 which is connected with the system 3 and thus moves along the mandrel during winding. The tying thread simultaneously promotes the embedding of the steelcord in the rovings. When the system 3 arrives at one end of the mandrel, the mandrel is axially turned by an angle sufficient to provide a new axial layer next to the layer which has just been layed. The system 3 returns axially to the other end of the mandrel and the other helical tying thread, delivered from spool 7, is now wrapped onto the new axial layer. This process is repeated until the whole mandrel is covered with axial layers. In each axial layer situated next to the neighboring axial layer on the circumference of the mandrel the steelcord is alternatively disposed on top, respectively at the underside of the rovings.

To control the lateral spacing of the steelcords, they are passed between two suitable grooved rollers 8 and between guiding bars 9 (e.g. from spring wire). It is also advantageous to guide the threads 5 through eyelets 10 which are arranged in close proximity to the mandrel 4 and to arrange the revolving rings carrying spools 6 and 7 somewhat eccentrically around the mandrel 4 and preferably in such a way that the center of the revolving system is situated below the center of the mandrel.

Advantageously the steel cord is delivered overhead from stationary spools 11 e.g. by means of a tubular flyer mechanism 12 as described in our copending British Application No. 14606/75. This arrangement provides a continuous supply of steel cord without undesired torsional stress (i.e. substantially free from twist) for as long as suitable reels of the steel cord continue to be available. However cord tension is limited with this system to almost 2 kgf per cord and heavy cords cannot be supplied by means of these stationary spool system. In the case of heavy cords, rotating spools are used.

Figure 3:
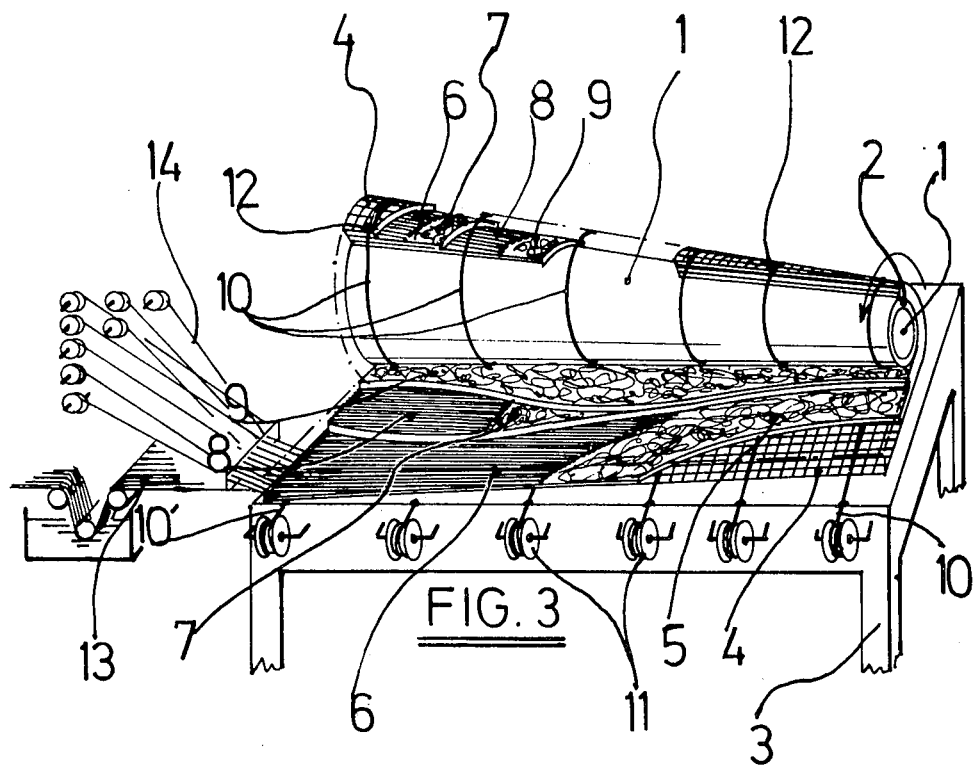
FIG. 3 is a perspective view of an apparatus for producing reinforced plastic pipes with a conical shape according to an alternative method.
Figure 4:
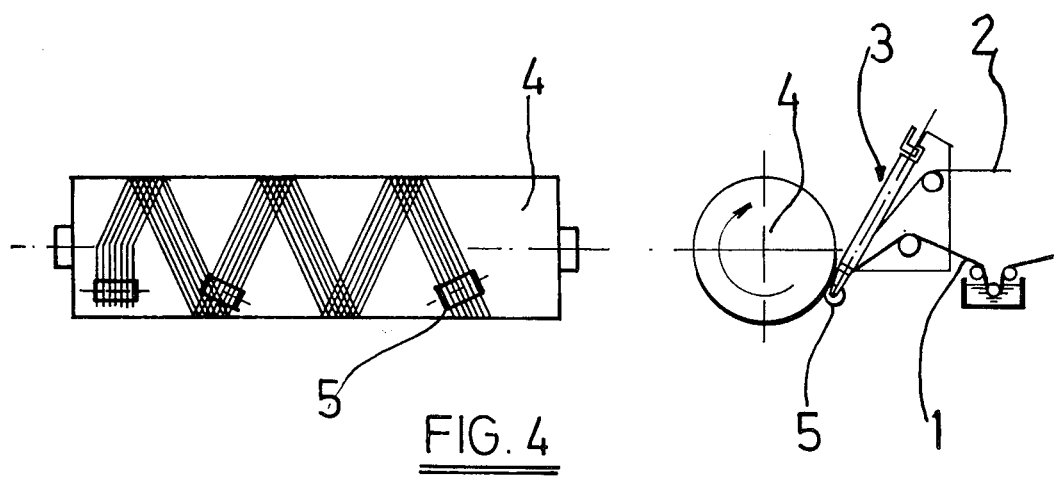
FIG. 4 is a view of an apparatus for producing reinforced plastic pipes according to the invention using glass fiber rovings and steel cords in a circumferential arrangement.

When the mandrel has a conical shape, the machine illustrated in FIGS. 1 and 2 and described above is not well suited as it causes an undue overlapping of reinforcing material at the top end of the cone. In this case the machine shown in FIG. 3 is preferred. The conical mandrel 1 is covered with an innerliner 2 and if desirable with circumferentially arranged layers of reinforcing material. The axial reinforcement is prepared on a separate table 3. On a supporting net structure 4 a resin impregnated glass fiber mat 5 is disposed, onto which a sheet 6 of resin impregnated glass rovings 13 and steel cords 14 is laid down in an axial arrangement. The surface of the sheet comprising axial rovings and cords is identical to the developed surface of the conical mandrel and the rovings and cords are directed according to the generating line of the conical surface. The axial sheet is covered by a resin impregnated glass fiber mat 7 and further by a sheet 8 of rovings and steel cord similar to sheet 6 which extends from the bottom of the cone to about halfway the length of the cone. A resin impregnated glass fiber mat 9 is put on top and again covers the whole surface. Typing threads 10 are delivered from spools 11 and pass under the net structure 4 several turns around the mandrel. The threads 10 are attached also at the leading end 12 of the net structure and the laminate is rolled onto the mandrel and tied thereon. The net structure and the attached tying threads permit to hold the axial steel cord and glass rovings firmly in their position so that their orientation on the mandrel surface coincides with the generating line of the cone when rolled onto it. This method is particularly suitable for lamp standards of long lengths (>8 m) with the shape of a truncated cone or pyramid (polygonal cross section). Axial reinforcement is imperative here and it was found that one laminated structure as described and with galvanized steel cords composed of a core wire with a diameter of 0.55 mm surrounded by 6 sheathing wires of each 0.47 mm in diameter performed very well in a lamp standard of 11 m in length with an inner diameter at its bottom end of 315 mm and at its top end of 110 mm. The laminated axial reinforcement structure was sandwiched between circumferential impregnated glassroving layers and the wall thickness of the standard was about 8 mm. When simultaneous winding of steel cords and impregnated glassrovings in circumferential (including helical) arrangement on a rotating mandrel is envisaged, the guiding system 3 illustrated in FIG. 4 is preferred. The rovings 1 and the steel cords 2 are guided by means of a system 3 which moves axially along the mandrel 4, whereas the combination of reinforcing strands 1 and 2 are passed over a grooved roller 5 in the vicinity of the mandrel surface and wound onto the rotating mandrel 4. To enable an exact guiding, the orientation of the axis of the guiding roller 5 should always be perpendicular to the direction of the reinforcing strands and hence the orientation of this axis should always be adapted to the winding angle of the circumferential layers to avoid friction or air inclusions. This winding angle is of course determined by the speed of the axial movement of the system 3 and the revolving speed of the mandrel 4.

The above-described apparatus (FIG. 1) for the axial winding of combined glass roving-steel cord layers can also be adapted for semi-automatic axial arrangement of woven cord layers. It is desirable that the cords in the axial woven cord layers are straight and under the same tension, otherwise the axial strength of the layer may be adversely affected. These uniform processing requirements can hardly be controlled manually, particularly where large diameter pipes are concerned. The apparatus illustrated in FIGS. 3 and 4 of the accompanying drawings comprises essentially a ring like framework 1 into which bobbins 2, carrying the woven cord layers can be mounted. The framework with the bobbins is also provided with a guiding system 3 for the woven cord layers and it can be moved axially along the stationary mandrel 4 of a conventional filament winding machine. The woven cord layers are delivered to the mandrel under a certain tension e.g. by exerting a braking action on the bobbins 2. To prevent any distortion of the axial arrangement, again a tying thread 5 is simultaneously wrapped with a large lay onto the applied axial layers by means of a suitable winding system 6 which is connected with the framework 1.

For long pipes it will be preferable not to arrange the bobbins 2 carrying the woven cord layers on the ring-frame 1, but to arrange them on a separate fixed frame, and to use the framework 1 with its guiding system 3 only as an intermediate device for exact guiding of the woven cord layers. With this modification it would also be possible to deliver and guide simultaneously with the woven cord layers a number of impregnated glass fiber rovings or fabrics which glass fiber materials could then cover or sandwich the steel cord layers or vice versa.

It has also been found that the application of prestressed steel cords e.g. in axial direction considerably favors the pipe strength. Indeed steel cord having a cable structure can elongate a little when it is put under slight tension. This small elongation capacity, hereinafter called structural elongation is due to the radial compaction of the cord whereby the sheathing wires or strands in the cord are serrated onto the core wire or strand when the cord is put under a small longitudinal tension. By further tensioning of the axially arranged cords to an amount below their elastic limit and maintaining this tension until the pipe is completely cured, a composite structure is obtained wherein the resin matrix is under axial compression force whereas the steel cord is still stress loaded. When such a pipe is now axially bended, certain zones in the pipe wall are exposed to compression forces whereas others are exposed to tensile stresses. In the compression zones the resin is then further compressed, but as it has a relatively good compression resistance this does not harm. The steel cord however is still under tensile stress in this zones and as steel cord has a far better tensile resistance than compression resistance, its reinforcing effect is optimal in these compression zones. On the other hand, in the zones under tensile stress, steel cord offers a suitable backbone for the resin matrix due to its high tensile strength. Resins have generally not a great tensile strength.

The application of prestressed cords is also of interest for the manufacture of sheet like laminated structures which can easily be prepared on a table in a similar way as described hereinbefore for the manufacture of conical pipes.

From the above considerations can be concluded that in certain circumstances a process is preferred whereby steel cord is put under a tension which is at least sufficient to eliminate the structural elongation in the cords.

EXAMPLES

The following materials were used in the construction of reinforced materials according to the invention:
1. Polyester resins:
   "I": Isophthalic acid based polyester resin ERVAPON type D 1324 (Plastimer — France)
   "D": Vinyl ester resin DERAKANE type 411-C-45 (Dow Chemical Switzerland)
   "O": Orthophthalic polyester resin ERVAPON type D 426 T (Plastimer — France)
2. Reinforcing materials:
   (a) Glass fiber-products: Rovings 2400 Tex type EC-14/K937 (Vetrotex) roving width about 4.2 mm, roving thickness about 0.45 mm, tensile strength about 160 kg/mm$^2$
   "RN" Rovinap 640405: undirectional continuous rovings stitched onto a non-woven web: total weight 730 g/m$^2$ (Chomarat)
   "300M" Staple glass fiber mat Vetrotex M 13: weight 300 g/m$^2$
   "450M" Staple glass fiber mat Vetrotex M 13: weight 450 g/m$^2$
   "V" non-woven fabric from synthetic fibers (liner) (Freudenberg) type H 3002 or type 1748
   (b) Steel cord products:
   steelcord SC 4.025 — cord in S or Z lay of 4 brass plated high carbon steel wires each having a diameter of 0.25 mm
   SC 7.025 — cord of 7 such wires of which one forms the core of the strand.
   SC 4.0175 — cord of 4 such wires having a diameter of 0.175 mm
   SCS — cord with a core having a diameter of 0.30 mm surrounded by 6 wires each having a diameter of 0.25 mm.
   woven cord WC 14: woven fabric comprising SC 4.025 cords as warp and nylon monofilaments as weft material, the fabric having a weight of 1400 g/m$^2$ i.e. approximately 897 warp ends per m or a packing factor of about 56.5%.
   WC 7: woven fabric comprising SC 4.0175 cords as warp and nylon filaments as weft material, the fabric having a weight of 700 g/m$^2$ (920 ends per m or a packing factor of 37%)

The polymerization system used was a conventional one using 2% Trigonox 42PR as a catalyst and 1% NL49 as accelerator (both of AKZO Chemie). Gelling and curing was carried out by infra red heating and at a continuously controlled temperature of 75° C.–85° C.

A first set of pipes were designed for use as lamp standards, transport masts for low voltage electrical and telephone cables, sailing boat masts, cantilever beams, and also chimneys. Conventional materials for such articles tend to have substantial drawbacks: aluminum may be too expensive, steel may require expensive maintenance, and concrete and steel may not be very safe and may involve high installation costs owing to their high weight. Authorities in several countries are now therefore promoting the use of reinforced plastics for these applications, especially where transport and maintenance is difficult (e.g. in mountainous regions). Axial rigidity and strength (e.g. bending resistance and tensile strength) are extremely important for these applications and it was found that glass fiber reinforcement alone could not provide a technical and an economical solution to this problem. Axial reinforcement with wire sheets provided enhanced rigidity for the pipes but the springy nature of the sheets raises difficulties in handling and processing which do not arise when using steel cord or woven steel cord. A representative test for evaluating the pipes in view of these end uses comprises a bending test whereby the pipes are clasped at one end and transversely loaded at the other (free) end. Bending strength $\sigma_b$ and bending modulus $E_b$ were determined on four different pipe constructions of which the structural elements will be defined as follows:
R means a circumferentially wound layer of continuous glass rovings.
AG: axially oriented layer of glass fiber rovings
(AG/2SC..): means axially oriented steel cord in contact with each glass fiber roving.

(AG/2SC..): means a similar structure but with two axially oriented steel cords on each glass fiber roving.

The "D" type resin was used for the pipes.
In the equations:

$$\sigma_b = [10PLD/(D^4 - d^4)] \text{ (kgf/mm2) and } E_b = (PL^3/3 \, If) \text{ (kgf/mm2)}$$

P is the applied transverse load at the end of the pipe (kgf)
L is the free length of the pipe tested (mm)
D is the outer diameter of the pipe (mm)
d is the inner diameter of the pipe (mm)
I is the moment of inertia (mm$^4$)
f is the moment of deflection (mm) at the end of the pipe Several pipes of each construction type were tested and the average values of $E_b$ and $\sigma_b$ were calculated.

TABLE 1

PIPE SPECIMEN with reinforcement - bending test - masts, lamp standards

| No. | $d_{(mm)}$ | $D_{(mm)}$ | $L_{(mm)}$ | Composition of pipe wall inside ——————→ outside | $E_b$ (kgf/mm$^2$) | $\sigma_b$ (kgf/mm$^2$) |
|---|---|---|---|---|---|---|
| 1 | 90 | 96.6 | 3500 | V-R-R-R-$\frac{AG}{SCS}$ — $\frac{AG}{SCS}$-R-R-V | 2270 | 27 |
| 2 | 90 | 98.8 | 3500 | V-R-R-R-AG-AG-AG-AG-R-R-V | 1240 | 14.8 |
| 3 | 28 | 34.2 | 1000 | V-R-R-R-$\frac{AG}{SCS}$ — $\frac{AG}{SCS}$-R-R-V | 2333 | 53 |
| 4 | 28 | 34.2 | 1000 | V-R-R-R-$\frac{AG}{2SC4.023}$ — $\frac{AG}{2SC4.025}$-R-R-V | 2296 | 51.2 |

Lamp standards are generally designed with a length between about 4 m and 18 m. A very advantageous composite steelcord reinforced pipe structure for this application seems to be composition 1 in Table 1. During the bending test, one part of the axial layers is stress loaded, whereas another part receives a compressive load. This unbalance in loading forces creates generally transverse stresses in the cross-section, tending to deform it radially. It is well known that this deformation (generally called ovalisation) of the pipe cross-section can be avoided by providing a structure which resists these radial stresses. Therefore three 90° circumferential resin-impregnated glass roving layers R were applied next to the inner liner V as a substructure to resist these radial stresses. Replacement layers R by a resin-impregnated glass fiber mat (M) can further enhance the stiffness and delamination resistance of this substructure which is in itself a strongly coherent laminate or sandwich structure.

This substructure was further covered by two subsequent composite axial layers each comprising axially oriented glass rovings wherein one steelcord (SCS) was arranged axially in contact with each of said rovings. In this way the steelcords were somewhat embedded in the glass rovings and so contact of the steelcords with the resin was better and the formation of air bubbles was minimized. Air bubbles are generally very harmful in reinforced plastics as they constitute weak points at which cracks first are initiated.

Finally two layers of impregnated glass rovings R were circumferentially wound on the axial layers and covered with an outer liner V. These two 90° circumferential layers have again a radial stiffening effect which tends to reduce ovalisation, and they also assist in supporting the axial layers and limiting the tendency of these layers to delaminate. To avoid delamination at the interfaces between an axial layer and a circumferential layer, the presence of a certain amount of chopped glass fibers sprayed onto the outerside of the underlying layer (by means of e.g. a conventional spray-up device comprising a chopper associated with a resin nozzle) is also useful.

The incorporation of steel cord imparts a substantial improvement in axial bending strength and modulus to the pipe as compared with pipes of similar structure reinforced with glass fiber alone, as illustrated by pipe 2 of Table 1.

The structure of pipe 3 of Table 1 with an identical composition to that of pipe 1 but with a small diameter was also tested and, as could reasonably be expected, it showed a substantially higher strength owing to its greater (D − d)/d ratio. In pipe 4 the two axial reinforcing layers were designed as follows: each layer comprising axial glass rovings and in contact with each glass roving two steelcords of the 4.025 construction were axially arranged. The steel weight in compositions 3 and 4 was comparable: namely 1330 g/m2 and 1350 g/m2 of pipe surface respectively. Strength and modulus are however better in pipe 3 which indicates that SCS cord is preferably used. From the point of view of processing the heavier cord SCS present additional advantages as only the half of the cords have to be handled compared to 4. Probably the SCS steel cord structure, comprising a core wire with a larger diameter surrounded by 6 sheathing wires with a smaller diameter, permits a better penetration of the resin in the cord and thus increases mechanical anchoring. The SCS-structure is also cheaper in terms of price per kg. From these test results can also be concluded that any combination of resin impregnated glass fibers and steel cord providing an intimate bond between them can be used e.g. by combining woven cord layers with impregnated glass fiber webs (thin mats M at one or both sides of the woven cord layer) e.g. by sticking thereto. The steel cords can also be embedded in the impregnated glass fiber rovings during axial winding as is illustrated e.g. in compositions 1, 3 and 4 in Table 1.

Another range of pipes were manufactured and tested for use as low pressure transport pipes or ducts for liquids which pipes or ducts are supported at regular distances e.g. in hangers or saddles. The distance which can be bridged by such liquid transport pipes between two subsequent supporting members should be as great as possible to minimize installation costs which depend in part upon the number of supporting members required per unit length or duct line or pipe line. Similarly the strength and creep resistance of the pipes at the supporting zones in the saddles is of utmost importance and by using the invention, locally reinforcements (by rings or the like) in these zones can be abandoned or at least minimized. Also large container bodies e.g. for road tankers are supported in saddles. A representative test for evaluating the durability of the pipes under the normal working conditions to which the pipes may be subjected is a three-point or four-point bending or load bearing test wherein the pipes are transversely supported at both ends and loaded either transversely halfway between said ends (three point bending ASTM-STP-327) or symmetrically at two points between the ends (four point bending). The four point bending test is also a reliable approach for evaluating the effect of uniform loading over the pipe length. The use of pipes as load bearing members as is the case for example with core tubes, spingles or beams for collecting and carrying heavy or large rolls of e.g. paper or textile material, is another instance where the proposed tests approach real working conditions most closely.

Axial strength is of utmost importance for such applications and hence axial reinforcing layers are very desirable. However, the steady transverse load bearing effect to which these pipes are subjected requires increased strength to prevent creep (both longitudinal extension and radial ovalisation). Hence in the compositions of Table 2 below, two 90° circumferential layers were wound onto the inner liner before the application of the helical layers (H). With H is meant a set of two superimposed and helically wound layers of glass rovings. It is known that reinforcement with exclusively helical layers has a weak resistance to shearing forces and hence to delamination as these layers displace themselves radially under tensile, compression or flexural stresses. The winding angle of the helical layers (H) was chosen at 54° with respect to the pipe axis.

Bending strength $\sigma_b$ and bending modulus $E_b$ were calculated according to the following equations:

three point bending $\sigma_b = (PLD/8I)$ (kgf/mm2) $E_b = (PL^3/48IF)$ (kgf/mm2)

four point bending $E_b = (PLa^2/2fI) [(1 - 4a/3L)]$

P means the total load transversely applied (kgf)
L means the distance between the supports at the end of the pipes and was here 1.4m
I means the moment of inertia (mm$^4$)
D means the outer diameter of the pipes (the inner diameter was 90 mm)
f means the deflection measured at the impact point(s) of the loads on the pipe
a means the distance between support point (pipe end) and impact point of load situated most close to said support point and was in these test cases 0.3 m Again several pipes were tested per composition and the $E_b$ and $\sigma_b$ values determined. The resin used was type "D" except in 10 and 11 where resin "I" was used. The test results of these compositions are summarized in Table 2. The differences in modulus between the three-point and four-point test were due to a greater ovalisation of the pipe cross-section during the four-point test at the impact point of the load which resulted in a different deflection (f) value. When rectifying these deviations in f-values, E was indeed the same for the three-point and four-point tests. In general the effect of sandwiching axial steelcord layers between circumferential glass roving layers (pipes 5, 6 and 11) was less favorable than expected due to air inclusions at the interfaces. In this way delamination occurs at said interfaces and thus glass fiber mats (M) should preferably be used to improve wetting and anchoring when woven cord is envisaged as a reinforcing material. A reinforcing substructure comprising at least one glass fiber layer sandwiched by two combination layers of woven cord and glass fiber mats can further best be supported by underlying circumferential reinforcing layers next to the pipe inside, to prevent pipe ovalisation. The effect of the resin strength is also well demonstrated by comparing 10 and 11 with 9 and 6 respectively.

TABLE 2

| | | Pipe Specimen - three point and four point bending tests | | | |
|---|---|---|---|---|---|
| | | | | \multicolumn{2}{c}{$E_b$ (kgf/mm2)} |
| No. | $D_{(mm)}$ | Composition of pipe wall inside — outside | $\sigma_b$ (Kgf/mm2) | 3 point bending | 4 point bending |
| 5 | 98.6 | V-R-R-H-H-R-AWC14-R-AWC14-R-V | 19.3 | 2610 | 2340 |
| 6 | 98.4 | V-R-R-H-H-R-AWC7-R-AWC7-R-V | 16.50 | 2082 | 2058 |
| 7 | 99.4 | V-R-R-H-H-R-AG-R-AG-R-V | 16.10 | 1985 | 1783 |
| 8 | 98.6 | V-R-R-H-H-R-AWC14-R-V | 18 | 2140 | 2023 |
| 9 | 98.6 | V-R-R-H-H-R-AWC7-R-V | 16 | 1782 | 1650 |
| 10 | 98 | V-R-R-H-H-R-AWC7-R-V | 13.4 | 1685 | 1569 |
| 11 | 98.2 | V-R-R-H-H-R-AWC7-R-AWC7-R-V | 14.3 | 1774 | 1819 |

In addition to the use of low pressure transport pipes or ducts in overhead locations there is an increasing demand for large diameter underground pipes, particularly sewer and effluent pipes which must be corrosion resistant. In addition, in view to their corrosion resistance which is better than that of coated steel pipes, reinforced plastic pipes have been proposed for transporting cooling water for electric generating stations and for pipes intended for example for laying in lakes or burying in corrosive soil or for discharging water into the sea. Other proposals include district heating pipes for distribution of hot water in densely populated areas, slurry piping systems to pump mixtures of solids and liquids such as coal slurry over long distances and underground pipelines for high voltage electric cables. In addition to their advantageous corrosion resistance, reinforced plastic pipes also have the advantage of lower installation costs in view to their light weight. Moreover measures to strengthen reinforced plastic pipes by incorporation of steel cord has the additional advantage that they can be made in longer lengths, thus bringing down significantly the number of costly joints. Increases in service life and elimination of excess weigth have given filament wound pipes a great advantage over previous concrete pipes in chemical waste pipe lines, the weight being less than 20% and service life twice as long. Furthermore, a filament wound pipe can more readily follow the trench profile in the ground due to their higher flexibility in comparison to a buried rigid pipe system such a steel-, concrete- and cement-/asbestos pipes.

Buried pipes are generally exposed to symmetrical compressive stresses and also, in certain areas where ground support is not balanced, to axial as well as radial bending forces. Internal pressure, when the pipes are used for example to transport slurries creates additional circumferential and longitudinal tensile stresses so that in fact a quite complicated stress situation can develop in such pipes. In view of this situation, several compositions were tested wherein a simultaneous circumferential winding was used of glass-rovings with steel cord, both on bobbins. As already mentioned previously, the great advantage of such a system resides in that it can be carried out with fairly simple, small and cheap auxiliary equipment which can be easily and quickly mounted on many kinds of conventional filament winding machines. Further the ratio between glass fiber rovings and steel cord can be easily varied according to the requirements of pipe characteristics. The constructions can thus be prepared economically and the steel cord is well embedded in the glass rovings. In Table 3 the following symbols were used to define the composite pipe structure:

R and H means respectively a 90° circumferential and helical layer of glass rovings whereby one steel cord is combined with each glass roving.

R and H means respectively a 90° circumferential and helical layer of glass rovings whereby one steel cord is combined with every third glass roving.

R and H means a 90° circumferential and helical layers of glass roving whereby one steel cord is combined with every sixth glass roving The winding angle was 60° with respect to the pipe axis for helical layers as a large angle is desirable to enhance the radial creep resistance of the pipe.

M225 means chopped glass fiber mat with a weight of 225 g/m².

The resin used in the type "0" mentioned above, filled with Microdol, essentially a $CaCO_3/MgCO_3$ composition. Filler percentage was 37.5% by weight of resin.

The steel cord used was SC 4.025 and the inner diameter $d$ of the pipes was 300 mm.

The tangential rigidity which is essential for buried pipes is best evaluated by means of an external plate loading test whereby a pipe segment is placed between two plates situated parallel to the pipe axis and whereby a load P is applied perpendicular to the pipe axis so as to deform (ovalise) the pipe transversely.

In the relationships rigidity factor (kgf/cm2/cm) $\quad SF = \dfrac{0.149\,Pd^3}{8fb}$ (ASTM 2412-68)

$b$ means the axial length of the tested pipe segment.
$f$ means the deflection measured at the impact point of the load.

Although the test method for determining the SF- and STIS-values is very similar, there is no relation between them, due to the entirely different way of calculation. In several countries, authorities still look for a relation with concrete and asbestos cementpipes and so the breaking load $P_r$ (kgf/m) and percent deflection at rupture ($f_r$) were also determined.

As considerable internal pressure is often present in buried pipes, the compositions 12 to 21 were also submitted to tensile tests (Nol Ring test ASTM-STP 327) and the tensile strengths $\sigma_t$ were determined. The length $b$ of the pipe segments tested was 150 mm and the relationships defining $\sigma_t$ are as follows:

$$\sigma_t = [P/b(D-d)] \text{ (Kgf/mm2)}$$

From Table 3 can be seen that in the first range of comparable compositions 12 to 15, composition 13 shows the best results over composition 12 taking into account that a relatively small amount of steel cord was added. Composition 21 seems to have a suitable structure in view of its tangential rigidity. The steel cord used should preferably be the SCS-type. Of course similar constructions will be useful for the design of large suction pipes (e.g. for ventilation pipes in mine shafts or for unloading grain etc.) and underground storage tanks where similar load situations are present.

Buried pipes should also have a good impact resistance as during installation e.g. with cranes, they are generally submitted to shocks, particularly when they are laid down in rocky areas. Therefore, some pipe structures of Table 3 were tested to determine their impact resistance (ASTM-D2444-70/tupA). An impact load weight of 5200 g was used and the falling height was varied progressively. The impact resistance value was considered to be reached when damage at the inner or at the outer surface of the pipe was noticed. In the compositions where steel cord was wound simultaneously with each glassroving in the outer layers, greater damage was observed at the pipe inside than at the pipe outside. Contamination by fluids from the outside is thus less probably in these cases. In the compositions where steel cord was situated in the inner layers, greater damage was observed at the pipe outside than at the pipe inside.

TABLE 3

EXTERNAL PLATE LOADING and Nol Ring (tensile strength) test

| Comp. | $D_{mm}$ | Composition of pipe wall inside | outside | SF kgf cm2/cm | Ec kgf mm2 | STIS N/m2 | Pr kgf m | fr % | σt kgf mm2 |
|---|---|---|---|---|---|---|---|---|---|
| 12 | 307.6 | V-R-H-R-V | | 960 | 1050 | 3350 | 1410 | 65 | 24 |
| 13 | 307.8 | V-R-H-R-V | | 1180 | 1220 | 4150 | 1757 | 67 | 27.5 |
| 14 | 308.2 | V-R-H-R-V | | 1580 | 1340 | 5510 | 2000 | 62 | — |
| 15 | 308.4 | V-R-H-R-V | | 1260 | 1360 | 4350 | 1175 | 50 | 24.6 |
| 16 | 309 | V-R-R-H-R-R-V | | 1670 | 1332 | 5820 | 1944 | 60 | 23.0 |
| 17 | 309.2 | V-R-R-H-R-R-V | | 2400 | 1447 | 8320 | 2520 | 60 | 23.3 |
| 18 | 311.4 | V-R-R-H-H-R-R-V | | 4410 | 1420 | 15130 | 3540 | 53 | 24.2 |
| 19 | 312 | V-R-H-R-AGRN-R-R-V | | 4000 | 1207 | 13700 | 2260 | 35 | 17.8 |
| 20 | 324.4 | V-R-R-H-H-H-R-ACW14-R-V (cf composition 8) | | 53400 | 1736 | 175100 | 4670 | 8 | — |
| 21 | 313 | V-M225-V-R-R-H-R-R-R-V | | 5190 | 1340 | 16300 | 7670 | 40 | 15.10 | modulus (kgf/mm2) $\quad EC = \dfrac{1.786\,Pd^3}{2\,bf(D-d)^3}$ (ASTM-STP-327)

specific tangential initial rigidity (N/mm²) $\quad STIS = \dfrac{0.01863\,P}{bf}$ (KOMO)

TABLE 4

| IMPACT RESISTANCE (kgom) | | | | | | | |
|---|---|---|---|---|---|---|---|
| Composition | 12 | 13 | 14 | 15 | 16 | 17 | 19 |
| Impact resistance | 143 | 182 | 156 | 286 | 156 | 442 | 1248 |
| Wall thickness | 3.8 | 3.9 | 4.1 | 4.2 | 4.5 | 4.6 | 6 |

TABLE 4-continued

IMPACT RESISTANCE (kgom)

(D - d) mm

Composition 13 gives an improvement in impact resistance over composition 12 of about 27%.

High pressure pipes, e.g. for the offshore oil and gas production industry, and pressure tanks offer another potential application for steel cord-reinforced plastic pipes according to the invention since such pipes and tanks need a long service life, a high safety factor and the ability to withstand relatively high pressures and pressure fluctuations. In practice, the burst pressure of such a pipe is not very relevant for evaluating its suitability as a pressure pipe since such a pipe must be replaced when it shows substantial leakage. The determination of the "weeping point" of the pipe i.e. the pressure at which a fluid in the pipe will start to seep through the pipe wall is therefore a more realistic test of the working conditions of pressure pipes and gives at the same time an indication of the life expectancy of the pipe. Experience with glass fiber reinforced pipes has shown that cycling the pressure creates a more rapid failure than testing under steady state pressure, due to an additional fatiguing effect. Water was used as testing fluid because it is well known that water has a destructive effect on glass fibers: the water penetration through microcracks accelerates the degradation of the pipe and is in fact the major cause of premature failure of the pipe. The determination of the ultimate strength and the internal cycle pressure tests were performed on pipes with unstrained ends so that also full axial stress loading was exerted on pipes as is the case in practice.

Once the weeping point was determined, pipes were submitted to a number of tests at cycling internal pressure values lower than said weeping point and with a pulse pressure frequency of 24 cycles per minute. A test period of $10^6$ cycles without pipe failure at a pressure P is comparable to a pipe life time at P of at least 15 years.

The compositions tested are represented in Table 5. The axial glass roving layers (Syncoglas), in composition 23 had a weight of about 650 g/m2. In pipe 24 the SC 4.025 type was used. It was also found that, when simultaneous circumferential winding of glass rovings and steel cord (pipe 24) is envisaged, this should preferably be done on a pregelled innerliner V or on a composite innerliner structure V- M - V, eventually pregelled to prevent transverse cutting of the cord through the underlying layers, particularly during pipe manufacture. The pipe inner diameter was 90 mm. For the design of high pressure pipes it is recommended to provide a reinforcing layer of circumferentially disposed steel cord adjacent to the inner liner.

In FIG. 7 a graph is represented illustrating the decrease of weeping resistance P as a function of the number of pressure cycles. It is quite clear from this graph that the steel cord reinforced composition give far better result than the other so that it can be concluded that steel cord is a surprisingly useful reinforcement for plastic pressure pipes. Particularly compositions with simultaneous circumferential winding of steel cord and glass rovings (e.g. pipe 24) show an outstanding good (weeping) pressure resistance. The slope of the lines in FIG. 7 for pure glass fiber reinforced pipes is somewhat steeper than for steel cord reinforced pressure pipes after about $10^4$ cycles which indicates that steel cord reinforced pipes show a better fatigue resistance and hence a longer life time even at higher working pressures.

Although the invention has been illustrated specifically by reference to cylindrical laminated structures containing glass fiber, steel cord and resin, i.e. pipe structures, it will be appreciated that the invention also includes within its scope the incorporation of steel cord in similar manner in pipes with a polygonal cross section, in laminates such as flat or curved or undulated plates or sheets and in three dimensional plastic structures such as profiles, cube-like structures, pyramids, cones etc. The winding of woven cord strips in combination with impregnated glassfiber strips in a circumferential direction by the use of the machine illustrated in FIG. 4 is also possible.

The resins used can be high performance polyesters such as certain types Atlac ® or Leguval ® or Palatal ® -resins. Specifically they can be chosen in function of their high temperature or fire resistance, high fatigue resistance, corrosion resistance, chemical resistance (against attack of acids, bases, organic solvents, salts, hydrolysing agents etc.).

TABLE 5

WEEPING TEST - High pressure pipes

| Pipe No. | Pipe composition inside→outside | weeping point p kg/cm2 |
|---|---|---|
| 6 | V-R-R-H-H-R-AWC7-R-AWC7-R-V | 120 |
| 7 | V-R-R-H-H-R-AG-R-AG-R-V | 110 |
| 22 | V-R-R-H-H-H-H-R-R-V | 80 |
| 23 | V-M450-R-AG-R-R-AG-R-V | 70 |
| 24 | V-M450-V-R-H-H-H-H-R-R-V | 160 |
| 25 | V-M450-V-R-R-H-H-H-R-AWC14-R-V | 150 |
| 26 | V-M450-V-R-H-H-AWC14-R-R-V | 145 |
| 27 | V-M450-V-R-H-H-AGRN-R-R-V | 100 |

The pipes can be provided with resin rich innerliners (V) and/or topcoats which act as corrosion barriers. For this purpose thixotropic materials such as aerosil can be incorporated in the resins of outer and inner liners. The resin compositions of the liners can also be selected in view of their chemical inertness. The liners V can e.g. also be composed of C-type glass fibers.

Under certain circumstances, brass coated steel cords should be replaced by galvanized (Zn-coated) cords, particularly when a slowly curing resin is employed to avoid reaction between $Cu^{++}$-ions and the resin. The reaction products namely decrease the adhesion between steelcord and resin. $Cu^{++}$-ions further are undesirable as they promote internal corrosion.

It is understood that the present application is intended to cover these and further modifications and variations, uses and/or adaptations of the invention following in general the principle of the invention and including such departures from the present disclosure as come within known or customary practice in the art to which the invention pertains, and as may be applied to the essential features hereinbefore set forth, as fall within the scope of the appended claims.

What we claim is:

1. A reinforced shaped synthetic composite comprising a reinforcing material consisting essentially of at least one layer of a combination of glass fibers and steel cord, said combination comprising steel cord at least partially embedded in glass fiber rovings having substantially the same orientation as the steel cord, a synthetic resin matrix material, said glass fiber rovings being impregnated by said matrix material.

2. A composite according to claim 1, wherein said combination is sandwiched between at least one woven steel cord layer and at least one glass fiber fabric.

3. A composite according to claim 2 wherein said fabric is a non woven fabric.

4. A composite according to claim 2, wherein a plurality of superimposed layers of said combination are present.

5. A composite according to claim 4, wherein glass fiber layers are situated interbetween the superimposed layers of said combinations.

6. A composite according to claim 5 wherein at least a part of said glass fiber layers are transversely oriented to the layers of said combinations.

7. A composite according to claim 1 in the form of a pipe.

8. A composite according to claim 7 wherein said combination is axially oriented in the pipe.

9. A composite according to claim 7 wherein said combination is circumferentially oriented in the pipe.

10. A composite according to claim 9 wherein said combination is helically oriented in the pipe.

11. A composite according to claim 7 wherein a first portion of said combinations are axially oriented and a second portion of said combinations are circumferentially oriented in said pipe.

12. A composite according to claim 7 wherein at least one reinforcing substructure comprising at least one glass fiber layer sandwiched by two layers of said combinations is present.

13. A composite according to claim 1 in the form of a sheet-like laminated structure.

14. A composite according to claim 13 wherein a number of said combinations are unidirectionally oriented in said structure.

15. A composite according to claim 13 wherein a number of said combinations are oriented in one direction whereas another number of said combinations are oriented transversely to said direction.

16. A composite according to claim 13 and including at least one reinforcing substructure comprising at least one glass fiber layer sandwiched by two layers of said combination.

17. A composite according to claim 1 in the form of a container having a laminated wall structure.

18. A composite according to claim 17 comprising a cylindrical body portion whereby said combinations are axially oriented in said portion.

19. A composite according to claim 17 comprising a cylindrical body portion whereby said combinations are circumferentially oriented in said portion.

20. A composite according to claim 19 wherein said combinations are helically oriented in said portion.

21. A composite according to claim 17 comprising a cylindrical body portion, whereby a first plurality of said combinations are axially oriented and a second plurality of said combinations are circumferentially oriented in said body portion.

22. A composite according to claim 17 comprising a cylindrical body portion including at least one reinforcing substructure, comprising at least one glass fiber layer sandwiched by two layers of said combinations.

23. A composite according to claim 1 wherein the steel cord is substantially free of torsional stresses.

24. A composite according to claim 1 wherein the steel cord is under a tension at least sufficient to eliminate its structural elongation.

25. A composite according to claim 1 wherein the steel cord is composed of a core wire surrounded by a number of sheathing wires, each having a diameter not in excess of that of said core wire.

26. A composite according to claim 25 wherein said core wire has a diameter of at least 0.20mm and is surrounded by four to seven wires.

27. A composite according to claim 1 wherein the steel cord is composed of a coreless strand of two to five wires.

28. A composite according to claim 27 wherein said wires each have a diameter between 0.15 mm and 0.60 mm.

29. A composite according to claim 1 wherein the steel cord is composed of a number of strands twisted together.

30. A composite according to claim 1 wherein the steel cord is composed of a core strand surrounded by a number of wires.

31. A composite according to claim 1 wherein the steel cord is composed of a core wire surrounded by a number of strands.

32. A composite according to claim 1 including a matrix of thermosetting resin.

33. A composite according to claim 32 wherein said resin is a polyester resin.

34. A composite according to claim 32 wherein said resin is an epoxy resin.

35. A composite according to claim 32 wherein the matrix includes a filler material.

36. A composite according to claim 35 wherein the filler is an inorganic material and is present in an amount of up to 60% by weight of the resin.

37. A composite as in claim 1 including a plurality of layers of said reinforcing material and wherein the ratio of the number of steel cords to the number of glass fiber rovings in each of said layers is not greater than two.

* * * * *

UNITED STATES PATENT AND TRADEMARK OFFICE
CERTIFICATE OF CORRECTION

PATENT NO. : 4,119,748
DATED : October 10, 1978
INVENTOR(S) : Germain Verbauwhede et al It is certified that error appears in the above-identified patent and that said Letters Patent are hereby corrected as shown below:

Column 14, TABLE 3, the Composition of the pipe wall for compositions 13-15, 17-19 and 21 should read:

Comp.

| | |
|---|---|
| 13 | V - R̲ - H̲ - R̲ - R̲ - V |
| 14 | V - R̲ - H̲ - R̲ - R̲ - V |
| 15 | V - R - H - R̲ - R̲ - V |
| 17 | V - R - R - H - R̲ - R̲ - V |
| 18 | V - R - R - H - H - R̲ - R̲ - V |
| 19 | V - R̲ - H̲ - R̲ - AGRN - R̲ - R̲ - V |
| 21 | V - M225 - V - R̲ - R̲ - H - R - R - R - V |

UNITED STATES PATENT AND TRADEMARK OFFICE
CERTIFICATE OF CORRECTION

PATENT NO. : 4,119,748

DATED : October 10, 1978

INVENTOR(S) : Germain Verbauwhede et al

It is certified that error appears in the above-identified patent and that said Letters Patent are hereby corrected as shown below:

Column 16, TABLE 5, the Composition of pipe wall 24 should read:

Comp.

24      V - M450 - V - $\underline{R}$ - $\underline{R}$ - $\underline{H}$ - $\underline{H}$ - $\underline{H}$ - $\underline{H}$ - $\underline{R}$ - $\underline{R}$ - V Signed and Sealed this Twelfth Day of June 1979

[SEAL]

Attest:

RUTH C. MASON  
Attesting Officer

DONALD W. BANNER  
Commissioner of Patents and Trademarks